(12) United States Patent
Matsubara

(10) Patent No.: US 10,140,688 B2
(45) Date of Patent: Nov. 27, 2018

(54) IMAGE PROCESSING APPARATUS FOR IMAGE PROCESSING BASED ON ACCURATE FUNDAMENTAL MATRIX

(71) Applicant: CASIO COMPUTER CO., LTD., Tokyo (JP)

(72) Inventor: Masao Matsubara, Kokubunji (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 148 days.

(21) Appl. No.: 15/065,603

(22) Filed: Mar. 9, 2016

(65) Prior Publication Data
US 2016/0371817 A1    Dec. 22, 2016

(30) Foreign Application Priority Data
Jun. 19, 2015  (JP) .................................. 2015-123594

(51) Int. Cl.
| | |
|---|---|
| *G06T 5/00* | (2006.01) |
| *G06T 7/33* | (2017.01) |
| *G06T 7/246* | (2017.01) |

(52) U.S. Cl.
CPC ............. *G06T 5/002* (2013.01); *G06T 7/246* (2017.01); *G06T 7/33* (2017.01)

(58) Field of Classification Search
CPC ......... G06T 7/593; G06T 5/002; G06T 7/246; G06K 9/46
See application file for complete search history.

(56) References Cited

U.S. PATENT DOCUMENTS

| | | | |
|---|---|---|---|
| 7,352,386 B1* | 4/2008 | Shum ..................... | G06T 17/00 348/42 |
| 9,317,973 B2* | 4/2016 | Choukroun ........... | G06T 19/006 |
| 2004/0213452 A1* | 10/2004 | Seo ......................... | G06T 7/593 382/154 |
| 2005/0219295 A1* | 10/2005 | Yamazaki .............. | B41J 2/2132 347/15 |

(Continued)

OTHER PUBLICATIONS

Goldstein et al; "Video Stabilization using Epipolar Geometry"; ACM Transaction on Graphics (TOG); vol. 31, Issue 5, Aug. 2012, Article No. 126.

*Primary Examiner* — Iman K Kholdebarin
*Assistant Examiner* — Mai Tran
(74) *Attorney, Agent, or Firm* — Fitch, Even, Tabin & Flannery LLP

(57) ABSTRACT

An image processing apparatus 1 includes a feature point set acquirer, a degree-of-scattering acquirer, a fundamental matrix acquirer and a processor. The feature point set acquirer acquires feature point sets, each including a plurality of feature points within an image. The degree-of-scattering acquirer acquires a degree of scattering indicating a degree of scattered distribution of the feature points. The fundamental matrix acquirer acquires a fundamental matrix, based on coordinates of the feature points p included in feature point sets acquired by the feature point set acquirer and the degree-of-scattering acquired by the degree-of-scattering acquirer, acquires a fundamental matrix indicating the epipolar geometric relationship between the image and another image in a video including the image. The processor performs image processing of the video based on the fundamental matrix acquired by the fundamental matrix acquirer.

9 Claims, 7 Drawing Sheets

(56) References Cited

U.S. PATENT DOCUMENTS

| | | | |
|---|---|---|---|
| 2011/0090343 A1* | 4/2011 | Alt | G06T 19/006 348/164 |
| 2011/0176007 A1* | 7/2011 | Ding | H04N 9/3182 348/189 |
| 2013/0322698 A1* | 12/2013 | Moden | G06T 7/2033 382/107 |
| 2014/0147032 A1* | 5/2014 | Yous | G06T 7/2033 382/154 |
| 2015/0104097 A1* | 4/2015 | Tsuzuki | G06T 7/0051 382/154 |
| 2015/0161474 A1* | 6/2015 | Jaber | G06K 9/52 382/203 |
| 2016/0034783 A1* | 2/2016 | Cheng | G06K 9/3233 382/195 |

* cited by examiner

IMAGE PROCESSING APPARATUS FOR IMAGE PROCESSING BASED ON ACCURATE FUNDAMENTAL MATRIX

CROSS-REFERENCE TO RELATED APPLICATION

This application claims the benefit of Japanese Patent Application No. 2015-123594, filed on Jun. 19, 2015, the entire disclosure of which is incorporated by reference herein.

FIELD

This application relates to an image processing apparatus for image processing based on an accurate fundamental matrix.

BACKGROUND

Technology is known for performing correction of hand jitter in a video by use of epipolar geometry. For example, Amit Goldstein and Raanan Fatal, "Video Stabilization Using Epipolar Geometry", ACM Transactions on Graphics (TOG), Volume 31, Issue 5, August 2012, Article No. 126 discloses technology for treating hand jitter in a video based on a fundamental matrix for expression of epipolar geometric relationships between frames, that is, images, included in the video.

SUMMARY

The image processing apparatus of the present disclosure includes a processing unit configured to execute steps including:

acquiring a feature point set comprising a plurality of feature points in an image;

acquiring a degree of scattering indicating a scattered distribution of the feature points in the image;

acquiring a fundamental matrix indicating an epipolar geometric relationship between the image and another image based on coordinates of the feature points included in the acquired feature point set and on the acquired degrees of scattering, wherein a video comprises the image and the other image; and image processing of the video based on the acquired fundamental matrix.

BRIEF DESCRIPTION OF THE DRAWINGS

A more complete understanding of this application can be obtained when the following detailed description is considered in conjunction with the following drawings, in which.

DETAILED DESCRIPTION

First Embodiment

Operation and function of an image processing apparatus according to an embodiment of the present disclosure is described below with reference to figures.

As an example of image processing, an image processing apparatus 1 in the present embodiment generates a corrected video by treating hand jitter of a target video. The target video, which is a video subjected to hand jitter, and a corrected video, which is a video corrected for hand jitter, include pluralities of frames, that is, images, that are imaged successively over time.

Figure 1:
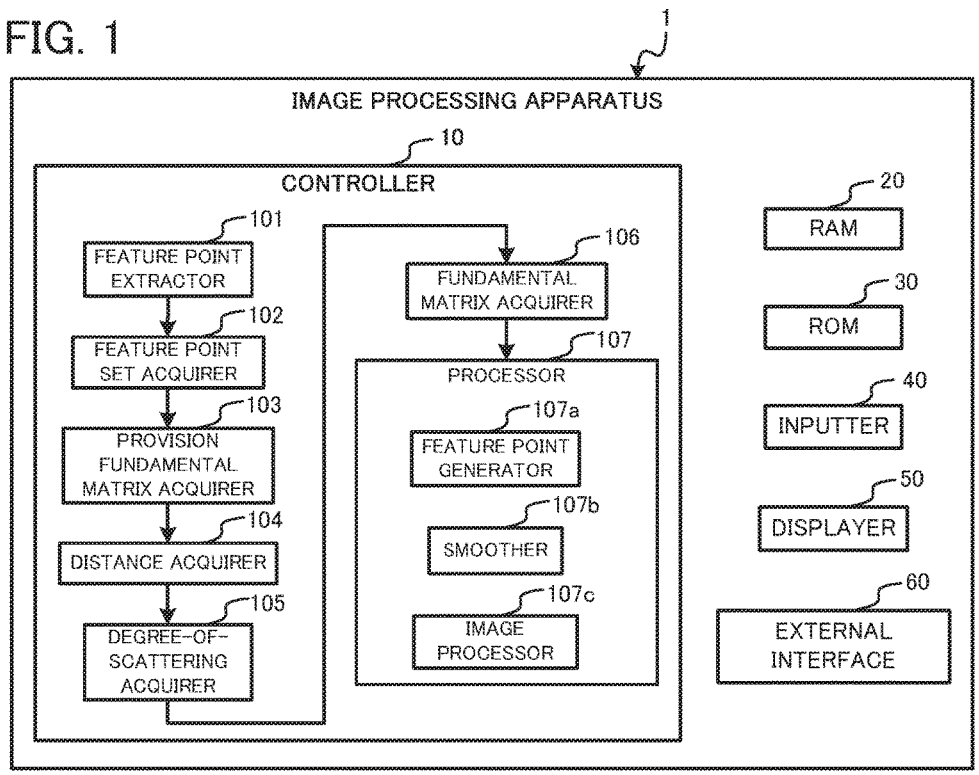
FIG. 1 is a block diagram showing an example configuration of an image processing apparatus according to a first embodiment of the present disclosure.

As indicated in FIG. 1, the image processing apparatus 1 includes a controller 10, a random access memory (RAM) 20, a read only memory (ROM) 30, an inputter 40, a displayer 50 and an external interface 60.

The controller 10 includes a processing unit and executes various types of programs stored in the ROM 30. Specifically, the controller 10 controls the overall image processing apparatus 1 by executing a control program stored in the ROM 30. Moreover, by execution of an image processing program stored in the ROM 30, as shown in FIG. 1, the controller 10 functions as: a feature point extractor 101, a feature point set acquirer 102, a provision fundamental matrix acquirer 103, a distance acquirer 104, a degree-of-scattering acquirer 105, a fundamental matrix acquirer 106 and a processor 107.

The feature point extractor 101 constructs a feature point trajectory P. The feature point trajectory P is a trajectory of a feature point p across a plurality of frames of the target video and indicates motion due to effects of jitter on an imaging apparatus imaging the target video. Hereinafter, the notation for the feature point included in an s-th frame is "feature point $p_s$". When specification of which frame includes the feature point is optional, the feature point is expressed simply as "feature point p".

Specifically, the feature point extractor 101 extracts the feature point p, that is, acquires coordinates of the feature point p, from the frame of the target video by use of a freely-selected known technique, such as the KLT method, Harris/Plessey method, or Hessian method. Then the feature point extractor 101 uses the extracted feature point p to construct the feature point trajectory P by time-wise tracking using a freely-selected known technique, such as an algorithm using block matching or concentration gradients.

The feature point set acquirer 102 acquires a plurality of feature points sets constructed using a plurality of feature points p within the frame.

Specifically, the feature point set acquirer 102 acquires a single pair of feature points by combining feature points $p_s$ and $p_t$, included in the same feature point trajectory P and occurring in two mutually different frames, for example, in an s-th frame and a t-th frame, respectively. The feature point set acquirer 102, by repeating such processing while sequentially selecting different feature point trajectories P, acquires a plurality of feature point pairs. Thereafter, eight pairs are selected from among the acquired plurality of feature point pairs, and a single feature point set is acquired by combination of eight feature points $p_t$ included in the same frame, referred to in the present embodiment as the t-th frame, from among the feature points $p_s$ and $p_t$ included in these feature point pairs. By repetition of this processing for a predetermined number of iterations, 500 times in the present embodiment, the feature point set acquirer 102 acquires a feature point set of a predetermined number of points, that is, 500 feature points in the present embodiment.

The provisional fundamental matrix acquirer 103, for the plurality of feature point sets acquired by the feature point set acquirer 102, acquires a provisional fundamental matrix F' corresponding to each feature point set, based on coordinates of the feature points $p_t$ included in each of the feature point sets.

The provisional fundamental matrix F' satisfies the below listed Equation 1 and indicates the epipolar geometric relationship between the two frames, that is between the s-th frame and the t-th frame. Within Equation 1, $m_s$ is a freely-selected point included in the s-th frame, and $m_t$ is a point corresponding to $m_s$ and included in the t-th frame. As shown by Equation 1, the provisional fundamental matrix F' has eight elements f1 through f8. By substitution into the Equation 1 as coordinates of corresponding points the coordinates of the eight feature points $p_t$ included in a single feature point set and the feature points $p_s$ forming the respective feature point pairs of these feature points $p_t$, the provisional fundamental matrix acquirer 103 acquires the elements f1 through f8 and thus acquires the provisional fundamental matrix F' corresponding to this feature point set. The notation hereinafter used to express the provisional fundamental matrix F' indicating the epipolar geometric relationship between the s-th frame and the t-th frame is "$F'_{s,t}$".

Equation 1

$$m_2^T \cdot F' \cdot m_2 = 0 \qquad (1)$$

where $$m_2 = \begin{pmatrix} x_2 \\ y_2 \\ 1 \end{pmatrix} \quad m_1 = \begin{pmatrix} x_1 \\ y_1 \\ 1 \end{pmatrix} \quad F' = \begin{pmatrix} f1 & f2 & f3 \\ f4 & f5 & f6 \\ f7 & f8 & 1 \end{pmatrix}$$

Based on the provisional fundamental matrix F' acquired by the provisional fundamental matrix acquirer 103, the distance acquirer 104 acquires a distance between an epipolar line projected by feature points $p_t$ and the feature points $p_s$ corresponding to these feature points $p_t$.

Using the provisional fundamental matrix $F'_{s,t}$ between these two frames, the epipolar line projected on the s-th frame by a freely-selected point $m_t$ ($x_t$, $y_t$, 1) included in the t-th frame is indicated by the below listed Equation 2. Within the Equation 2, f1 through f8 are the elements of the provisional fundamental matrix $F'_{s,t}$ indicated by the Equation 1. Distance dist between the epipolar line indicated by the Equation 2 and a freely-selected point $m_s$ ($x_s$, $y_s$, 1) in the s-th frame is indicated by the below listed Equation 3. Within Equation 3, a through c are coefficients of the epipolar line indicated by the Equation 2. As the epipolar geometric relationship of the provisional fundamental matrix F' between a certain point and the corresponding point becomes more accurate, distance decreases between the epipolar line projected by the certain point and the point corresponding to the certain point.

Equation 2

$$ax + by + c = 0 \qquad (2)$$

where $$a = f1 \cdot x_t + f4 \cdot y_t + f7$$
$$b = f2 \cdot x_t + f5 \cdot y_t + f8$$
$$c = f3 \cdot x_t + f6 \cdot y_t + 1$$

Equation 3

$$dist = \frac{ax_s + by_s + c}{\sqrt{a^2 + b^2}} \qquad (3)$$

The degree-of-scattering acquirer 105 acquires the degree of scattering. The degree of scattering indicates the degree of scattering of the scattered distribution of feature points in the frame.

In the present embodiment, the degree-of-scattering acquirer 105 acquires the degrees of scattering corresponding to each provisional fundamental matrix F' acquired by the provisional fundamental matrix acquirer 103. The degree of scattering corresponding to a certain provisional fundamental matrix F' indicates the degree of scattering of the feature points, among the plurality of feature points p included in the frame, that have a distance, acquired by the distance acquirer based on this provisional fundamental matrix F', that is less than or equal to a threshold.

In the aforementioned manner, as the provisional fundamental matrix F' indicates increasing accuracy of the epipolar geometric relationship between the certain point and the corresponding point, the distance, which is acquired by the distance acquirer 104 based on this provisional fundamental matrix F', between the epipolar line projected by this point and the corresponding point becomes smaller. That is to say, the feature point p that has a distance, acquired by the distance acquirer 104 based on a certain provisional fundamental matrix F', less than or equal to the threshold value is a feature point for which this provisional fundamental matrix F' indicates that accuracy of the epipolar geometric relationship is greater than or equal to a fixed level. The degree of scattering corresponding to a certain provisional fundamental matrix F' indicates the degree of scattering of the scattered distribution within the frame of the feature points p for which this provisional fundamental matrix F' indicates that the epipolar geometric relationship relative to corresponding points is accurate.

Figure 2:
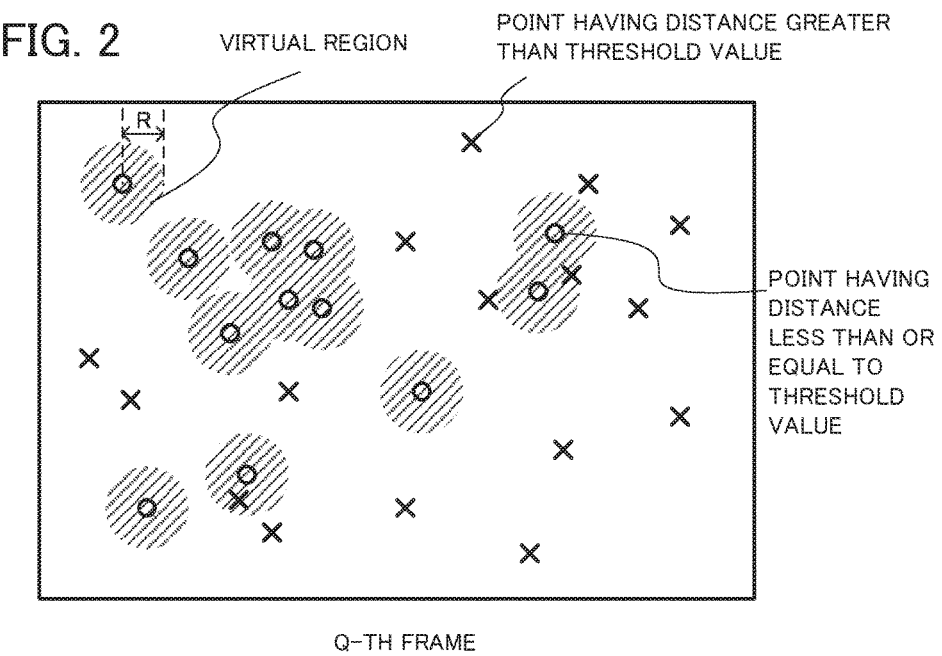
FIG. 2 is a diagram for explanation of an example of degree of scattering.

Specifically, the degree-of-scattering acquirer 105 generates virtual regions by using as benchmarks all the feature points p for which the distance acquired by the distance acquirer 104 is less than or equal to the threshold, the threshold in the present embodiment being 0.1 pixels. In the present embodiment, as shown in FIG. 2, the virtual regions are generated as circles of a predetermined radius R (in the present embodiment, R=32 pixels) centered on each of the feature points p. The degree-of-scattering acquirer 105 acquires as the degree of scattering of these feature points p, that is, as the degree of scattering corresponding to the provisional fundamental matrix F', the total value of non-overlapping areas of the all the generated virtual regions. Furthermore, the total value of non-overlapping areas of the virtual regions is a value found by totaling the areas of the virtual regions while including an area of a multiply overlapped virtual region area only once. Furthermore, the shape of the virtual region is not limited to a circle, and this shape may be freely selected. Moreover, in the present embodiment, although the center of the virtual region coincides with the feature point p, or a virtual feature point v, this arrangement is merely an example. The relationship between the position of the virtual region and the position of the feature point p, or the virtual feature point v, can be set in a freely selected manner.

The fundamental matrix acquirer 106 acquires the fundamental matrix F based on the coordinates of the feature point p included in the feature point set acquired by the feature point set acquirer 102 and the degree-of-scattering acquired by the degree-of-scattering acquirer 105. The fundamental matrix F indicates the epipolar geometric relationship between two frames.

In the present embodiment, the fundamental matrix acquirer 106, among the plurality of provisional fundamental matrixes F' acquired by the provisional fundamental matrix acquirer 103, acquires as the fundamental matrix F the provisional fundamental matrix F' for which the degree-of-scattering acquired by the matrix acquirer 103 is largest. As the degree of scattering corresponding to a certain provisional fundamental matrix F' becomes larger, the feature points p, for which the provisional fundamental matrix F' accurately indicates the epipolar geometric relationship relative to the corresponding points, become widely scattered and distributed in the frame. That is to say, in the frame, the range indicating accurately the epipolar geometric relationship by this provisional fundamental matrix F' is broad. By acquiring the provisional fundamental matrix F' for which the degree of scattering is largest, the fundamental matrix acquirer 106 acquires as the fundamental matrix F the provisional fundamental matrix F' that has been optimized, that is, has the greatest accuracy, over the widest range within the frame.

The processor 107 executes image processing of a target video based on the fundamental matrix F acquired by the fundamental matrix acquirer 106. In the present embodiment, as shown in FIG. 1, the processor 107 includes a feature point generator 107a, a smoother 107b and an image processor 107c, and generates the corrected video by treating hand jitter in the target video based on the fundamental matrix F acquired by the fundamental matrix acquirer 106.

Specifically, the processor 107 treats the hand jitter in the target video based on the fundamental matrix F by executing the below listed processing of (A) through (D).

(A) Construct a virtual feature point trajectory V based on the fundamental matrix F.

(B) By smoothing the virtual feature point trajectory V, construct a hand jitter-corrected virtual feature point trajectory V'.

(C) Based on the feature point trajectory P and a fundamental matrix F''', construct a hand jitter-corrected feature point trajectory P'.

(D) Based on a feature point trajectory P and the hand jitter-corrected feature point trajectory P', perform image processing and generate the corrected video.

Each of the processes is explained below in detail.

Figure 3:
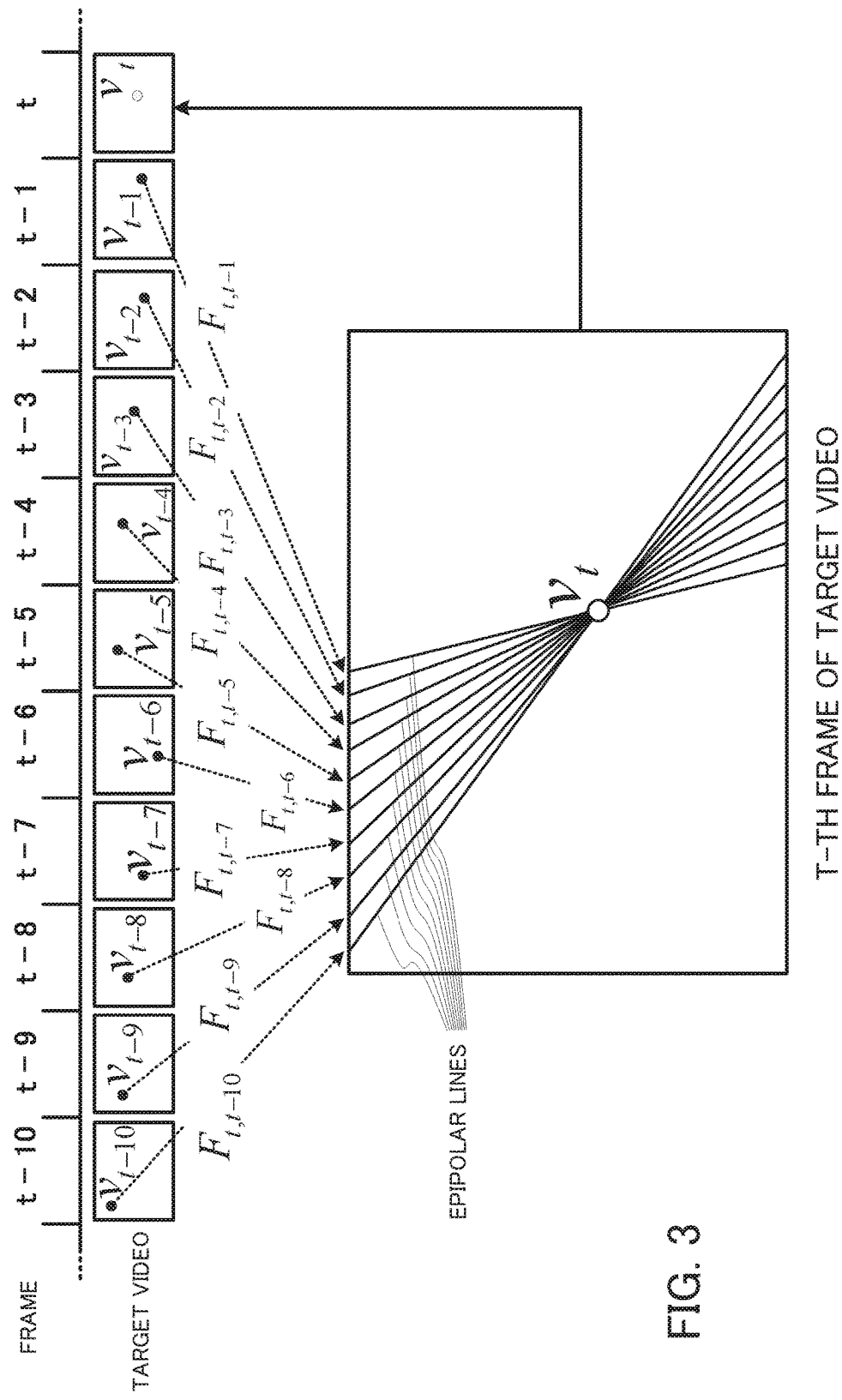
FIG. 3 is a diagram for explanation of construction of a virtual feature point trajectory.

The processing of (A) is performed by the feature point generator 107a. As shown in FIG. 3, in the frame (t-th frame) of the target video, the feature point generator 107a acquires the epipolar lines projected by virtual feature points $v_{t-1}$ through $v_{t-10}$ included in ten frames ((t−1)-th frame through (t−10)-th frame) of images immediately prior to this frame, and based on fundamental matrixes $F_{t,t-1}$ through $F_{t,t-10}$, acquires as coordinates of the virtual feature point $v_t$ (generates the virtual feature point $v_t$) average values of coordinates of the intersection points of these epipolar lines. The feature point generator 107a constructs a virtual feature point trajectory V by acquiring the virtual feature point $v_t$ as a component point occurring in the t-th frame.

The virtual feature point trajectory V is a trajectory of a virtual feature point v across a plurality of frames of the target video and indicates motion, affected by hand jitter, of the imaging apparatus that imaged the target video. In contrast to the feature point trajectory P indicating motion affected by hand jitter of the imaging apparatus similarly to the virtual feature point trajectory V and being formed from feature points p extracted from the frames, the virtual feature point trajectory V is formed from the theoretically calculated virtual feature points v. Thus when the feature point p becomes hidden behind an object so as to cause a frame-out, when a tracking error occurs, and the like, there is no discontinuity of the virtual feature point trajectory V, even though the feature point p cannot be extracted from the frame and the feature point trajectory P is discontinuous. That is to say, the virtual feature point trajectory V is continuous over a longer range than the feature point trajectory P. Thus by using the virtual feature point trajectory V to define movement of the imaging apparatus affected by hand jitter, in the below-described (C) processing, smoothing can be performed using a larger scale filter than can be used than when movement is defined by the feature point trajectory P, and smoother motion of the hand jitter-corrected imaging apparatus can be acquired.

The (B) processing is executed by the smoother 107b. The smoother 107b constructs the hand jitter-corrected virtual feature point trajectory V' by time-wise smoothing by use of a freely-selected known technology, such as smoothing using a Gaussian or Laplacian kernel, for smoothing the virtual feature point trajectory V constructed during the processing of (A). The hand jitter-corrected virtual feature point trajectory V' is the trajectory of the hand jitter-corrected virtual feature point v' over all of a plurality of frames of the corrected video and indicates movement of the imaging apparatus imaging the target video without the effect of hand jitter. In the present embodiment, the smoother 107b smoothes the virtual feature point trajectory V by use of a Gaussian filter in which σ is equal to 50.

After execution of the (B) processing, the fundamental matrix acquirer 106, based on the virtual point trajectory V constructed during the (A) processing and the hand jitter-corrected virtual feature point trajectory V' constructed during the (B) processing, acquires the fundamental matrix F''' that indicates the epipolar geometric relationship between the frame within the target video and the frame within the corrected video. That is to say, the relationship between the frames before versus after hand jitter correction is defined based on the virtual feature point trajectory V and the hand jitter-corrected virtual feature point trajectory V'.

Figure 4:
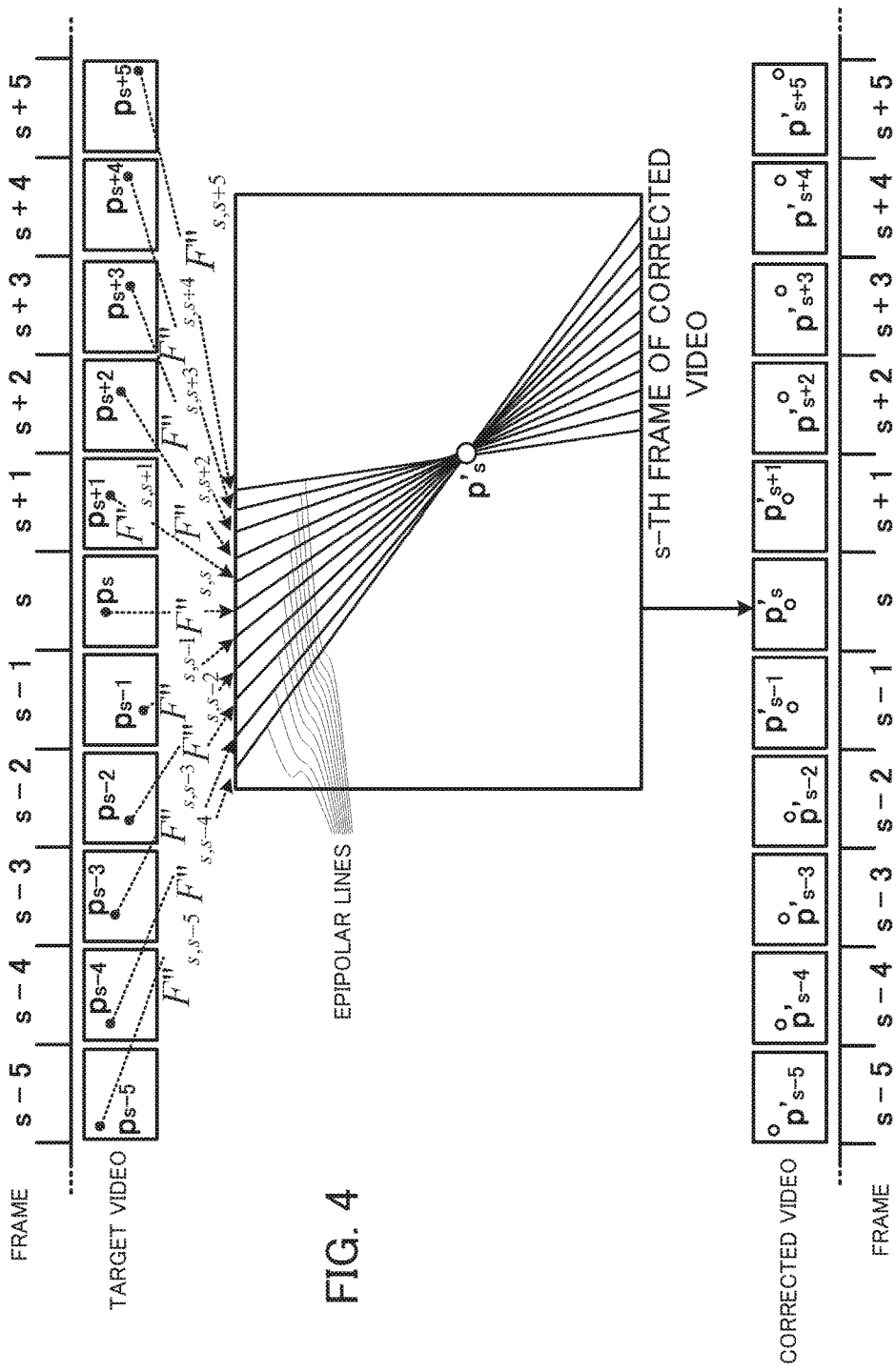
FIG. 4 is a diagram for explanation of construction of a hand-jitter-corrected feature point trajectory.

The (C) processing is executed by the feature point generator 107a. As shown in FIG. 4, the feature point generator 107a, based on the fundamental matrixes $F'''_{s,s-5}$ through $F'''_{s,s+5}$, acquires each of the epipolar lines projected by the feature points $p_{s-5}$ through $p_{s+5}$ included in five frames ((s−5)-th frame through (s+5)-th frame) imaged before and after this frame in the target video, and acquires, as the coordinates of the hand jitter-corrected feature point $p'_s$, the average values of coordinates of the intersection points of these epipolar lines. These average values of coordinates of the intersection points of these epipolar lines are acquired as coordinates of the hand jitter-corrected feature point $p'_s$. The feature point generator 107a constructs the hand jitter-corrected feature point trajectory P' by acquiring the hand jitter-corrected feature point p's as the point included in the s-th frame.

The image processor 107c executes the (D) processing. The image processor 107c treats hand jitter of each frame for all the pixels included in each frame of the target video by using a freely-selected known technique, such as Helmert, affine, or projection transformation, to perform image processing that moves the feature point p, included in this frame of the feature point trajectory P, to the hand jitter-corrected feature point p' corresponding to this feature point p.

With reference again to FIG. 1, the RAM 20 temporarily stores data or programs. When the controller 10 executes various types of programs, the RAM 20 functions as a working memory.

The ROM 30 stores the data or programs in a non-transient manner.

Specifically, in the present embodiment, the ROM 30 stores beforehand a target video, that is, the video subjected to hand jitter, acquired from an external device. Moreover, the ROM 30 stores various types of programs, including a control program and an image processing program.

The inputter 40 receives user operation-based input. The inputter 40 supplies the received input to the controller 10.

The displayer 50 is equipped with a display, such as a liquid crystal display (LCD), and displays an image supplied from the controller 10. For example, the displayer 50 displays the corrected video and/or target video supplied from the controller 10.

The external interface 60 exchanges data with an external device. For example, the external interface 60 acquires the target video from the external device. Moreover, the external interface 60 outputs the corrected video to the external device.

Hand jitter processing executed by the image processing apparatus 1 configured in the aforementioned manner is explained below with reference to the flowchart of FIG. 5.

The ROM 30 of the image processing apparatus 1 stores the target video, subjected to hand jitter, acquired beforehand from outside.

By operation of the inputter 40, a user desiring execution of hand jitter correction processing selects "hand jitter mode", which is one mode of a plurality of operation modes with which the image processing apparatus 1 is equipped. In response to the selection of the "hand jitter mode", the controller 10 acquires the image processing program from the ROM 30 and deploys the image processing program in the RAM 20. Moreover, the controller acquires the target video from the ROM 30 and deploys the target video in the RAM 20.

By operation of the inputter 40, the user commands the start of hand jitter correction processing. In response to the commanding of the start of hand jitter correction processing, the controller 10 starts the hand jitter correction processing shown in the flowchart of FIG. 5.

When hand jitter correction processing starts, firstly the feature point extractor 101 constructs a predetermined number (100 in the present embodiment) of the feature point trajectories P by time-wise tracking of the feature point p over all the frames of the target video (step S101).

Thereafter, the controller 10 designates the initial frame of the target video as the t-th frame (step S102). The initial frame of the target video is the frame of the oldest imaging time among the plurality of frames including in the target video. Thereafter, the controller 10 designates the (t−10)-th frame of the target video as the A-th frame (step S103). The (t−10)-th frame is the frame ten frames prior to the t-th frame.

Figure 6:
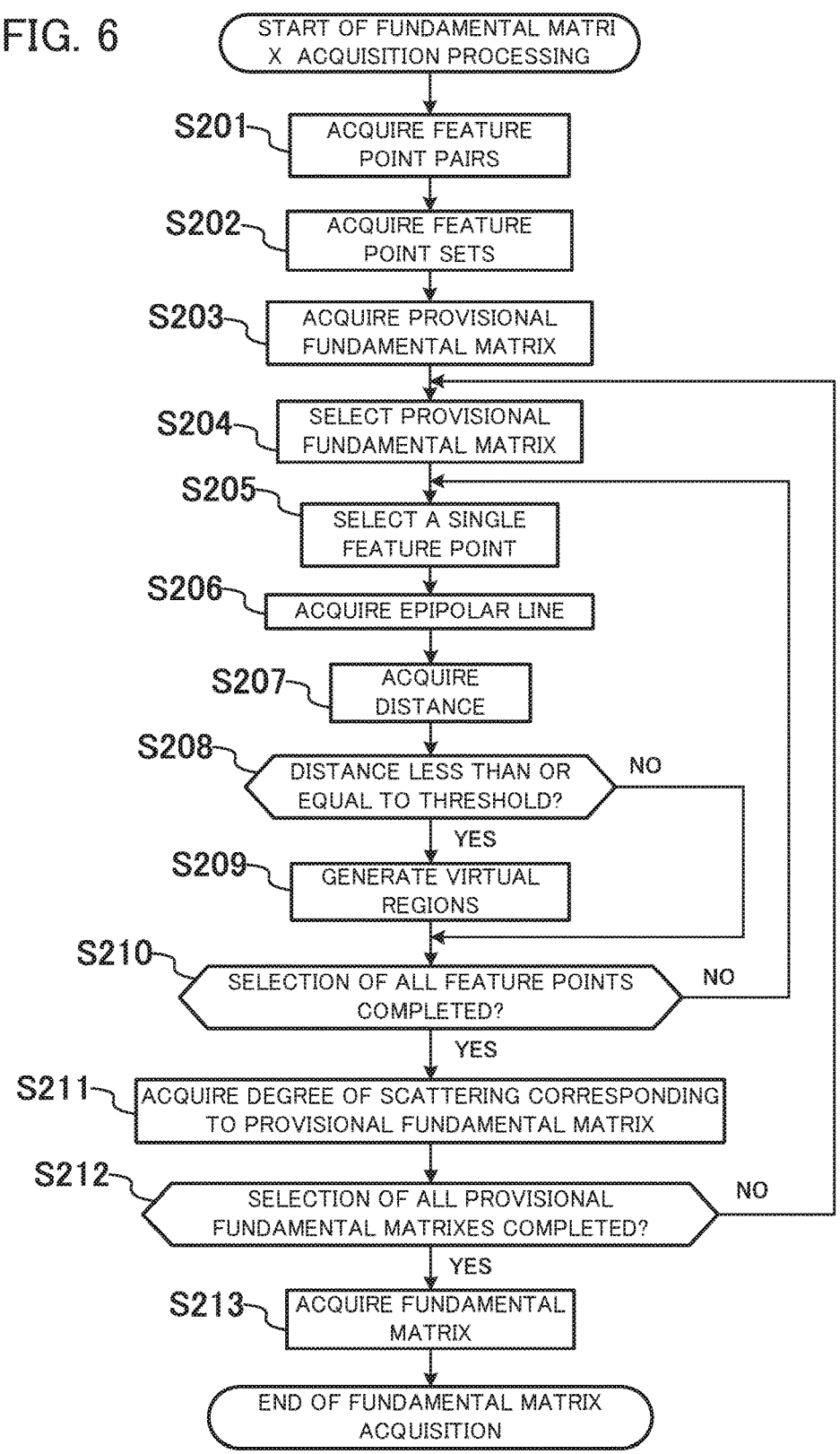
FIG. 6 is a flow chart for explanation of fundamental matrix acquisition processing executed by the image processing apparatus according to the first embodiment of the present disclosure.

By execution of the fundamental matrix acquisition processing, the feature point set acquirer 102 through the fundamental matrix acquirer 106 acquire the fundamental matrix $F_{t,A}$, that is, acquire the fundamental matrix indicating the epipolar geometric relationship between the t-th frame and the A-th frame of the target video (step S104). Hereinafter, details of the fundamental matrix acquisition processing of the step S104 are explained with reference to the flowchart of FIG. 6.

When fundamental matrix acquisition processing of step S104 starts, firstly the feature point set acquirer 102 acquires a plurality of feature point pairs by repeated processing to acquire a single feature point pair by combining the feature points $p_t$ and $p_A$ occurring in the t-th frame and A-th frame, respectively, of the same feature point trajectory P (step S201).

The feature point set acquirer 102 randomly selects eight pairs from among the plurality of feature point pairs acquired in the step S201, and acquires a predetermined number of feature point sets (in the present embodiment, 500 sets) by repeated processing to acquire a single feature point set by combining only the feature points $p_t$ in the t-th frame including these feature point pairs (step S202).

The provisional fundamental matrix acquirer 103 acquires the provisional fundamental matrixes $F'_{t,A}$ corresponding to each of the 500 feature point sets acquired in the step S202 (step S203).

The degree-of-scattering acquirer 105 selects a single matrix from among the 500 provisional fundamental matrixes $F'_{t,A}$ acquired in the step S203 (step S204). Execution of the below processing of step S205 through step S211 is used to acquire the degree of scattering corresponding to the provisional fundamental matrix $F'_{t,A}$ selected in the step S204.

From among the plurality of feature points $p_t$ included in the t-th frame of the target video, the distance acquirer 104 selects a single point (step S205).

Based on the provisional fundamental matrix $F'_{t,A}$ selected in step S204, the distance acquirer 104 acquires the epipolar line projected on the A-th frame of the target video by the feature point $p_t$ selected in the step S205 (step S206).

The distance acquirer 104 acquires the distance between the epipolar line acquired in the step S206 and the feature point $p_A$ in the A-th frame corresponding to the feature point $p_t$ selected in the step S205 (step S207).

The degree-of-scattering acquirer 105 determines whether the distance acquired in the step S207 is less than or equal to the predetermined threshold, that is, 0.1 pixel in the present embodiment (step S208). When the distance is determined to be larger than 0.1 pixel (NO in step S208), processing proceeds to step S210.

When the distance is determined to be less than or equal to 0.1 pixel (YES in step S208), the degree-of-scattering acquirer 105 generates, as the virtual region, a circle of a predetermined radius R (in the present embodiment, R=32 pixels) centered on the feature point $p_t$ selected in the step S205 (step S209). Furthermore, in the step S209 a circle of the predetermined radius R centered on the feature point $p_A$ (corresponding to this feature point $p_t$), rather than the feature point $p_t$ selected in step S205, may be generated as the virtual region.

The degree-of-scattering acquirer 105 determines whether selection has been completed of all feature points $p_t$ included in the t-th frame of the target video (step S210). When determination is made that there exist unselected feature points $p_t$ (NO in step S210), then processing returns to the step S205, and a single point is selected from among the unselected feature points $p_t$. By repeating of the processing of step S205 through step S210 until determination is made that all the feature points $p_t$ have been selected, among the feature points $p_t$ in the t-th frame of the target video, the degree-of-scattering acquirer 105 generates virtual regions centered on all of the feature points $p_t$ for which the provisional fundamental matrix $F'_{t,A}$ selected in the step S204 indicates that the epipolar geometric relationship relative to the corresponding point has an accuracy greater than or less than a fixed level.

When determination is made that all the feature points $p_t$ have been selected (YES in step S210), the degree-of-scattering acquirer 105 acquires, as the degree of scattering corresponding to the provisional fundamental matrix $F'_{t,A}$ selected in the step S204, a total value obtained by overlap-free combination of the areas of all the generated virtual regions (step S211).

The degree-of-scattering acquirer 105 determines whether selection is completed for all the 500 provisional fundamental matrixes $F'_{t,A}$ acquired in the step S203 (step S212). When determination is made that there exists a provisional fundamental matrix $F'_{t,A}$ for which selection is not performed yet (NO in step S212), processing returns to step S204, and one matrix is selected from among the unselected provisional fundamental matrixes $F'_{t,A}$. By repetition of the processing of step S204 through step S212 until determination is made that selection is completed for all the provisional fundamental matrixes $F'_{t,A}$, the degree-of-scattering acquirer 105 acquires the degree of scattering corresponding to all the provisional fundamental matrixes $F'_{t,A}$ acquired in the step S203.

When determination is made that selection of all the provisional fundamental matrixes $F'_{t,A}$ is completed (YES in step S212), the fundamental matrix acquirer 106 acquires, as the fundamental matrix $F_{t,A}$, the provisional fundamental matrix $F'_{t,A}$ having the greatest degree of scattering (step S213), and the fundamental matrix acquisition processing ends.

Again with reference to FIG. 5, after completion of the fundamental matrix acquisition processing of step S104, the controller 10 increments the value A by 1 (step S105). That is to say, the controller 10 switches from the A-th frame, which is the subject of fundamental matrix acquisition processing of the step S104, to the next imaged frame. For example, when the (t−10)-th frame of the target video is designated as the A-th frame in the fundamental matrix acquisition processing executed immediately beforehand, the controller 10 designates, as the new A-th frame, the (t−9)-th frame, which is the frame newly imaged immediately after the (t−10)-th frame.

The controller 10 determines whether the incremented value of A is equal to the value t (step S106). That is to say, the controller 10 determines whether the A-th frame equals the t-th frame. When these values are not equal (NO in step S106), processing returns to the step S104. By repeating the processing of step S104 through step S106 until determination is made that the value of A is equal to the value of t, the controller 10 acquires the fundamental matrixes $F_{t,t-10}$ through $F_{t,t-1}$ indicating the epipolar geometric relationship between the t-th frame and the ten frames immediately prior to the t-th frame, that is, the (t−10)-th frame through (t−1)-th frame.

When the value of A and the value of t are determined to be equal (YES in step S106), the controller 10 increments the value of t by 1 (step S107). The controller 10 determines whether the incremented t-th frame matches the final frame of the target video (step S108). The final frame of the target video is the newest imaged frame among the plurality of frames included in the target video. If the determination is that the frames do not match (NO in step S108), processing returns to the step S103. By repeating the processing of the step S103 through the step S108 until determination is made that the t-th frame matches the final frame, for each of the frames of the target video, the controller 10 acquires the fundamental matrix F indicating the epipolar geometric relationship relative to each of the immediately prior ten frames.

When determination is made that the t-th frame matches the final frame (YES in step S108), the feature point generator 107a constructs the virtual feature point trajectory V based on the fundamental matrix F (step S109). The smoother 107b constructs the hand jitter-corrected virtual feature point trajectory V' by smoothing the virtual feature point trajectory V constructed in the step S109 (step S110).

Next, the controller 10 designates the initial frame of the corrected video as the s-th frame (step S111). The controller 10 designates the (s−5)-th frame of the target video as the B-th frame (step S112).

By executing the fundamental matrix acquisition processing, the feature point set acquirer 102 through fundamental matrix acquirer 106 acquire a fundamental matrix $F''_{s,B}$, that is, a fundamental matrix indicating the epipolar geometric relationship between the corrected video s-th frame and the target video B-th frame (step S113).

The fundamental matrix acquisition processing of the step S113 is the same as the aforementioned fundamental matrix acquisition processing of step S104, and thus detailed description is omitted. Furthermore, according to the fundamental matrix acquisition processing of the step S113, in the step S201 of the FIG. 6 flowchart, feature point pairs are acquired that include mutually corresponding virtual feature points $v_B$ and hand jitter-corrected virtual feature points $v'_s$. Specifically, the feature point set acquirer 102 acquires the feature point pairs by combination of the virtual feature points $v_B$ included in the virtual feature point trajectory V and the hand jitter-corrected virtual feature points $v'_s$ that form the hand jitter-corrected virtual feature point trajectory V' constructed by smoothing this virtual feature point trajectory V.

Figure 5:
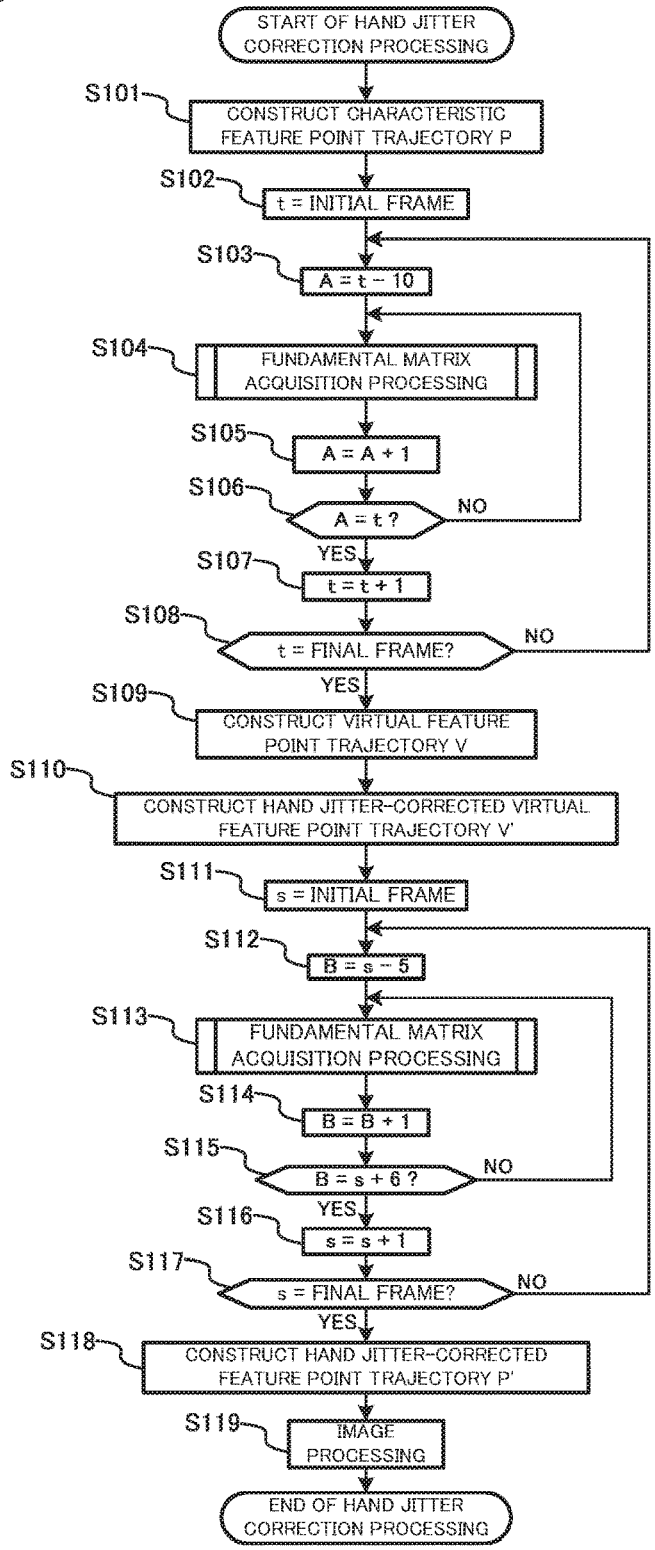
FIG. 5 is a flow chart for explanation of hand jitter correction processing performed by an image processing apparatus according to the first embodiment of the present disclosure.

With reference to the previously mentioned flowchart of FIG. 5, after the fundamental matrix acquisition processing of the step S113, the controller 10 increments the value of B By 1 (step S114). The controller 10 determines whether the incremented value of B is equal to the value (s+6) (step S115). If determination is made that these values do not match (NO in step S115), processing returns to the step S113. By repeating the processing of the step S113 through step S115 until determination that the value of B matches the value (s+6), the controller 10 acquires the fundamental matrixes $F''_{s,s-5}$ through $F''_{s,s+5}$ indicating the epipolar geometric relationship between the corrected video s-th frame and each of the target video (s−5)-th frame through (s+5)-th frame.

When determination is made that the value of B is equal to the value (s+6) (YES in step S115), the controller 10 increments the value of s by 1 (step S116). The controller 10 determines whether the incremented s-th frame matches the final frame of the corrected video (step S117). If determination is made that the frames do not match (NO in step S117), processing returns to the step S112. By repeating the processing of the step S112 through step S117 until determination that the s-th frame matches the final frame, for all of the frames of corrected video, the controller 10 acquires the fundamental matrix F indicating the epipolar geometric relationship relative to each of the five earlier and later frames of the target video.

When determination is made that the s-th frame matches the final frame (YES in step S117), based on the fundamental matrix F'" and the feature point trajectory P constructed in the step S101, the feature point generator 107a constructs the hand jitter-corrected feature point trajectory P' (step S118).

For each of the frames of the target video, the image processor 107c treats hand jitter based on the feature point trajectory P and the hand jitter-corrected feature point trajectory P' (step S119), and hand jitter correction processing ends.

As explained above, the image processing apparatus 1 of the present embodiment acquires, as the fundamental matrix, the provisional fundamental matrix that has the highest accuracy, by acquisition of the fundamental matrix as the provisional fundamental matrix having the greatest degree of scattering. The image processing apparatus 1 treats hand jitter in the video based on this fundamental matrix. That is to say, based on an accurate fundamental matrix, the image processing apparatus 1 can execute hand jitter correction.

Second Embodiment

The imaging processing apparatus 1 of the first embodiment acquired the accurate fundamental matrix based on the degree of scattering corresponding to the provisional fundamental matrix. However, this configuration is merely one example, and the image processing apparatus of the present disclosure can obtain the accurate fundamental matrix based on other degrees of scattering that relate to the feature points p. Function and operation of an image processing apparatus 1', for acquiring the accurate fundamental matrix based on the degree of scattering of the feature points p included in the feature point set, are explained below.

Figure 7:
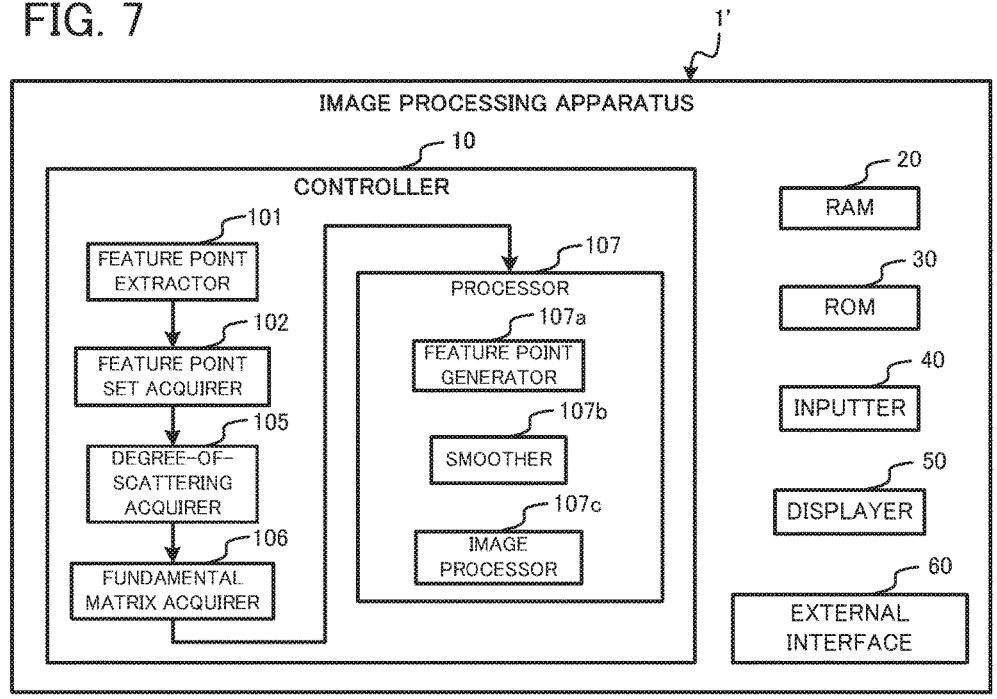
FIG. 7 is a block diagram showing an example configuration of an image processing apparatus according to a second embodiment of the present disclosure.

As shown in FIG. 7, the image processing apparatus 1' is equipped with nearly the same configuration as that of the image processing apparatus 1. However, the image processing apparatus 1' differs from the image processing apparatus 1 in that the former is not equipped with the provisional fundamental matrix acquirer 103 and the distance acquirer 104. Moreover, the functions of the degree-of-scattering acquirer 105 and the fundamental matrix acquirer 106 of the image processing apparatus 1' differ from the functions of the degree-of-scattering acquirer 105 and the fundamental matrix acquirer 106 of the image processing apparatus 1.

Specifically, the degree-of-scattering acquirer 105 of the image processing apparatus 1' acquires the degree of scattering corresponding to each feature point set acquired by the feature point set acquirer 102. The degree of scattering corresponding to the feature point sets indicates the degree of scattering of the scattered distribution, in the frame, of the feature points p included in the feature point sets.

Based on coordinates of the feature points p included in the feature point set having the largest degree of scattering from among the plurality of feature point sets acquired by the feature point set acquirer 102, the fundamental matrix acquirer 106 acquires the fundamental matrix F indicating the epipolar geometric relationship between two frames, that is, between the s-th frame and the t-th frame. Specifically, the fundamental matrix acquirer 106 acquires the fundamental matrix F by substituting into the Equation 1 the coordinates of eight feature points $p_t$ included in the feature point set having the greatest degree of scattering and the feature points $p_s$ forming the feature point pairs together with these feature points $p_t$.

The fundamental matrix F accurately indicates the epipolar geometric relationships of the feature points $p_s$ and $p_t$ corresponding to one another in the eight pairs for which coordinates were used in order to acquire this fundamental matrix F. Therefore, to the extent that the feature points $p_t$ for which coordinates were used in the acquiring of the fundamental matrix are distributed in a widely scattered manner in the frame (t-th frame), the feature points $p_t$, which accurately indicate the relationship between this fundamental matrix F and the corresponding points, are distributed in a widely scattered manner in the t-th frame. Based on acquisition of the fundamental matrix F based on the coordinates of the feature points p included in the feature point set having the greatest degree of scattering, the fundamental matrix F acquired by the fundamental matrix acquirer 106 is optimized, that is, has good accuracy, over the widest range in the frame.

Hand jitter processing executed by the image processing apparatus 1' having the aforementioned configuration is explained below in detail. The image processing apparatus 1' executes nearly the same hand jitter correction processing as the hand jitter correction processing indicated by the flowchart of FIG. 5. However, in the step S104 and step S113, rather than the fundamental matrix acquisition processing shown in the flowchart of FIG. 6, the image processing apparatus 1' executes the fundamental matrix acquisition processing shown in the flow chart of FIG. 8. The fundamental matrix acquisition processing shown in the flowchart of FIG. 8 is explained hereinafter.

Figure 8:
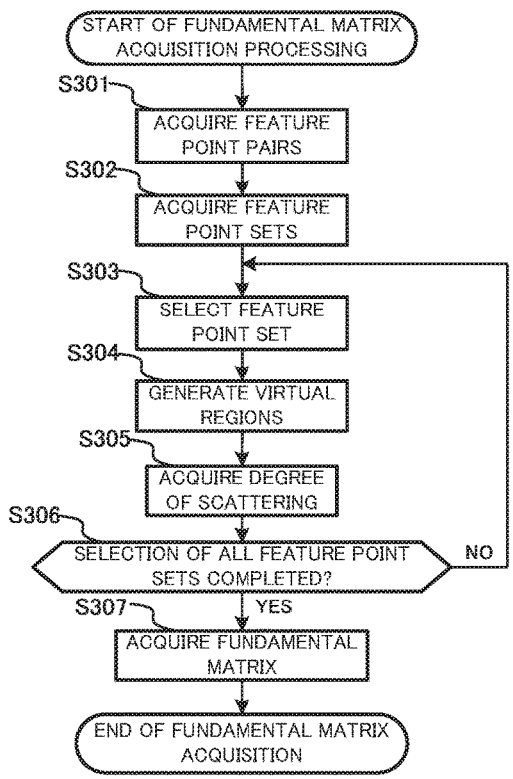
FIG. 8 is a flow chart for explanation of fundamental matrix acquisition processing executed by the image processing apparatus according to the second embodiment of the present disclosure.

When the fundamental matrix acquisition processing of the flowchart of FIG. 8 starts, firstly the feature point set acquirer 102 acquires a plurality of feature point pairs by repeatedly performing acquisition of a single feature point pair by, among the feature point trajectories P constructed in the step S101 of the flowchart of FIG. 5, combining the mutually corresponding feature points $p_t$ and $p_A$ that are included in the t-th frame and A-th frame of the same feature point trajectory P (step S301).

The feature point set acquirer 102 randomly selects eight pairs of points from among the plurality of feature point pairs acquired in the step S301, and acquires a predetermined number of feature point sets (in the present embodiment, 500 sets) by repeating the processing for acquiring a single feature point set by combination of the feature points $p_t$ in the t-th frame included in these feature point pairs (step S302).

The degree-of-scattering acquirer 105 selects one among the 500 feature point sets acquired in the step S302 (step S303).

The degree-of-scattering acquirer 105 generates, as virtual regions, circles of the predetermined radius R centered on each of the feature points $p_t$ that are included in the feature point set selected in the step S303 (step S304).

The degree-of-scattering acquirer 105 acquires, as the degree of scattering corresponding to the feature point set selected in the step S303, a total value obtained by overlap-free combining of the areas of all the generated virtual regions (step S305).

The degree-of-scattering acquirer 105 determines whether there is completion of selection of all the feature point sets (step S306). When there is a determination that there exists a non-selected feature point set (NO in step S306), processing returns to the step S303, and a single set is selected from among the non-selected feature point sets.

When there is a determination that the selection of all the feature point sets is completed (YES in step S306), the fundamental matrix acquirer 106 acquires the fundamental matrix F based on the coordinates of the feature points p included in the feature point set having the greatest degree of scattering (step S307), and the fundamental matrix acquisition processing ends.

As described above, the image processing apparatus 1' of the present embodiment acquires the accurate fundamental matrix based on the degree of scattering corresponding to the feature point set. Based on the acquired fundamental matrix, the image processing apparatus 1' treats hand jitter in the target video.

The image processing apparatus 1' differs from the image processing apparatus 1 of the first embodiment in that the former does not perform calculating of the provisional fundamental matrix, acquiring of the epipolar lines, and acquiring of distances. Thus, in comparison to the image processing apparatus 1, the burden of processing is low, and hand jitter-correction can be performed by use of the accurate fundamental matrix.

In the above described embodiments of the present description, the image processing apparatus 1 acquires the target video beforehand from the external device and stores the target video. However, this configuration is merely one example, and the image processing apparatus 1 itself may generate the target video. In such a configuration, the image processing apparatus 1 includes an imager. The imager generates the target video by imaging an imaging target.

In the above described embodiments, as the degree of scattering of the plurality of feature points p, the total value is obtained by overlap-free combination of the areas of the virtual regions generated based on the plurality of feature points p. However, this configuration is merely one example, and other values may be acquired as the degree of scattering of the feature points p.

For example, dispersion or standard deviation of values of the coordinates of the plurality of feature points p may be acquired as the degree of scattering of these feature points p. According to this aspect, because there is no requirement for processing to generate the virtual regions and to combine the areas of the generated virtual regions without overlap, computational burden is decreased in comparison to the aforementioned embodiments.

Moreover, average value or median value of distances between the plurality of feature points p may be acquired as the degree of scattering of these feature points p. According to this aspect, because there is no requirement for processing to generate the virtual regions and to combine the areas of the generated virtual regions without overlap, computational burden is decreased in comparison to the aforementioned embodiments.

Figure 9:
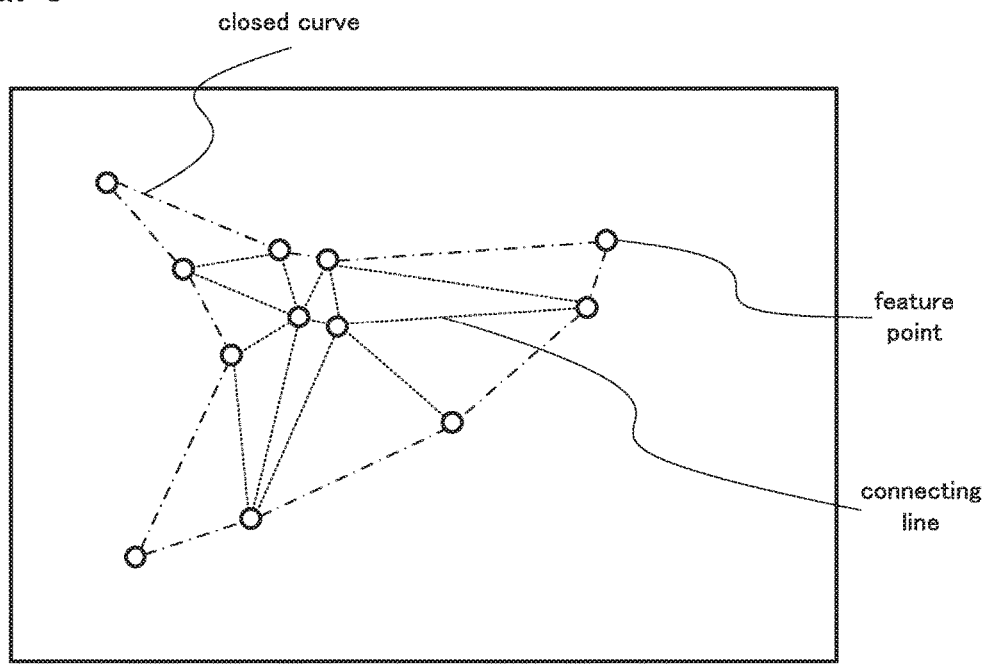
FIG. 9 is a diagram for explanation of another example of degree of scattering.

Moreover, as shown in FIG. 9, the degree of scattering of the multiple feature points p may be acquired as a length of a closed curve, that encompasses these feature points and is formed by straight lines (connected lines) connecting together these feature points p, or as an area of a region that encloses this closed curve. According to this aspect, because there is no requirement for processing to generate the virtual regions and to combine the areas of the generated virtual regions without overlap, computational burden is decreased in comparison to the aforementioned embodiments. Furthermore, the shape of the closed curve formed by connecting lines and enclosing the feature points p can be acquired by use of a freely-selected known technology. For example, Takashi Ouchi, Masahide Abe, and Masayuki Kawamata, "Use of Delaunay Triangulation for Connection of Points Forming Discontinuous Contour Line", 2000 Tohoku-Section Joint Convention of Institutes of Electrical and Information Engineers, Japan, Collected Lectures and Articles, August of 2000, p. 159 discloses technology using Delaunay triangulation to acquire shape of a closed curve enclosing points, the shape including straight lines mutually interconnecting a plurality of points.

Figure 10:
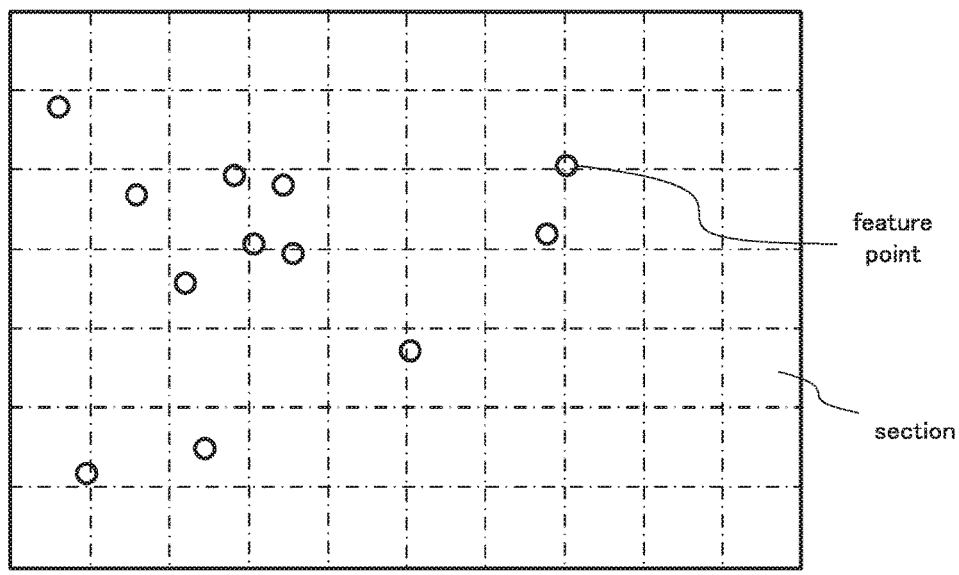
FIG. 10 is a diagram for explanation of yet another example of degree of scattering.

Moreover, as shown in FIG. 10, the degree of scattering of these feature points p may be acquired by dividing the frame into a plurality of sections and then using, as the degree of scattering, the number of sections including a feature point p. According to this aspect, because there is no requirement for processing to generate the virtual regions and to combine the areas of the generated virtual regions without overlap, computational burden is decreased in comparison to the aforementioned embodiments.

A freely-selected electronic device, such as smart phone, computer, digital camera, personal digital assistant (PDA) and the like, can be enabled to function as the image processing apparatus of the present disclosure.

Specifically, the smart phone, computer, digital camera, PDA and the like electronic device can be enabled to function as the image processing apparatus of the present disclosure by storage and distribution of a program, for operating the image processing apparatus, on a readable recording medium (such as a memory card, compact disc read-only memory (CD-ROM), digital versatile disc read-only memory (DVD-ROM) and the like), and by installation of the program.

Alternatively, the aforementioned program may be stored beforehand on a storage device, such as a disc device or the like, of a server on a communication network such as the internet or the like, and the aforementioned program may be downloaded so that the smart phone, computer, digital camera, PDA and the like is enabled to the function as the image processing apparatus of the present invention.

Moreover, when the function of the image processing apparatus of the present disclosure is enabled by cooperative or shared execution between an operating system (OS) and an application program, the recording medium or memory device may store just the application program portion.

Moreover, the application program may be used to modulate a carrier wave and may be distributed through a communication network. For example, the application program may be posted on a bulletin board system (BBS) on a communication network, and the application program may be distributed through the network. Also, a computer may be enabled to function as the image processing apparatus of the present disclosure by installation and operation of this application program on the computer, and by execution of the application program, in the same manner as other application programs, under control of the OS.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An image processing apparatus comprising a processor, the processor configured to execute hand jitter-correction processing comprising:
   acquiring a plurality of feature point sets each comprising a plurality of feature points in an image;
   generating, for each of the plurality of feature point sets, virtual regions based on the plurality of feature points included in each feature point set;
   calculating, for each of the plurality of feature point sets, a total value of areas of the generated virtual regions, and acquiring the calculated total value as a degree of scattering indicating a scattered distribution of the feature points in the image;
   acquiring a fundamental matrix indicating an epipolar geometric relationship between the image and another image based on coordinates of the feature points included in the feature point set having a largest total value of the acquired total values among the acquired plurality of feature point sets, wherein a video comprises the image and the other image; and
   generating hand jitter-correction feature point trajectories from the video based on the acquired fundamental matrix,
   wherein when calculating, for each of the plurality of feature point sets, the total value of the areas of the generated virtual regions, the acquiring of the degree of scattering includes calculating, for an overlapped portion of the virtual regions, the total value by including an area of the overlapped portion in the total value only once.

2. The image processing apparatus according to claim 1, wherein
   the processor is configured to further execute steps comprising:
      acquiring provisional fundamental matrixes indicating the epipolar geometric relationship between the image and the other image, based on the coordinates of the feature points included in the acquired feature point set; and
      acquiring distances between epipolar lines projected on the other image by the feature points in the image and the feature points in the other image, corresponding to the feature points in the image based on the acquired provisional fundamental matrixes,
   wherein the generating of the virtual regions includes generating, for each of the feature point sets, the virtual regions based on, among the plurality of feature points included in each feature point set, the feature points for which the distance acquired based on the provisional fundamental matrixes in the acquiring of the distances is within a threshold value.

3. The image processing apparatus according to claim 1, wherein
   when generating, for each of the plurality of feature point sets, the virtual regions based on the plurality of feature points included in each feature point set, the generating of the virtual regions include generating the virtual regions having the same area.

4. An image processing method for hand jitter-correction processing comprising steps of:
   acquiring a plurality of feature point sets each comprising a plurality of feature points in an image;
   generating, for each of the plurality of feature point sets, virtual regions based on the plurality of feature points included in each feature point set;
   calculating, for each of the plurality of feature point sets, a total value of areas of the generated virtual regions, and acquiring the calculated total value as a degree of scattering indicating a scattered distribution of the feature points in the image;
   acquiring a fundamental matrix indicating an epipolar geometric relationship between the image and another image based on coordinates of the feature points included in the acquired feature point set having a largest total value of the acquired total values among the acquired plurality of feature point sets and on the acquired degrees of scattering, wherein a video comprises the image and the other image; and
   generating hand jitter-corrected feature point trajectories from the video based on the acquired fundamental matrix,
   wherein when calculating, for each of the plurality of feature point sets, the total value of the areas of the generated virtual regions, the acquiring of the degree of scattering includes calculating, for an overlapped portion of the virtual regions, the total value by including an area of the overlapped portion in the total value only once.

5. The image processing method according to claim 4, further comprising steps of:
   acquiring provisional fundamental matrixes indicating the epipolar geometric relationship between the image and the other image, based on the coordinates of the feature points included in the acquired feature point set; and
   acquiring distances between epipolar lines projected on the other image by the feature points in the image and the feature points in the other image, corresponding to the feature points in the image based on the acquired provisional fundamental matrixes,
   wherein the generating of the virtual regions includes generating, for each of the feature point sets, the virtual regions based on, among the plurality of feature points included in each feature point set, the feature points for which the distance acquired based on the provisional fundamental matrixes in the acquiring of the distances is within a threshold value.

6. The image processing method according to claim 4, wherein:
   when generating, for each of the plurality of feature point sets, the virtual regions based on the plurality of feature points included in each feature point set, the generating of the virtual regions include generating the virtual regions having the same area.

7. A non-transitory computer-readable recording medium recording a program for enabling a computer to execute hand jitter-correction processing comprising:
   acquiring a plurality of feature point sets each comprising a plurality of feature points in an image;
   generating, for each of the plurality of feature point sets, virtual regions based on the plurality of feature points included in each feature point set;
   calculating, for each of the plurality of feature point sets, a total value of areas of the generated virtual regions, and acquiring the calculated total value as a degree of scattering indicating a scattered distribution of the feature points in the image;
   acquiring a fundamental matrix indicating an epipolar geometric relationship between the image and another image based on coordinates of the feature points included in the acquired feature point set having a largest total value of the acquired total values among the acquired plurality of feature point sets and on the acquired degrees of scattering, wherein a video comprises the image and the other image; and generating hand jitter-corrected feature point trajectories from the video based on the acquired fundamental matrix, wherein when calculating, for each of the plurality of feature point sets, the total value of the areas of the generated virtual regions, the acquiring of the degree of scattering includes calculating, for an overlapped portion of the virtual regions, the total value by including an area of the overlapped portion in the total value only once.

8. The non-transitory computer-readable recording medium according to claim 7, wherein the program further enables the computer to execute steps comprising:

acquiring provisional fundamental matrixes indicating the epipolar geometric relationship between the image and the other image, based on the coordinates of the feature points included in the acquired feature point set; and acquiring distances between epipolar lines, projected on the other image by the feature points in the image and the feature points in the other image, corresponding to the feature points in the image based on the acquired provisional fundamental matrixes, wherein the generating of the virtual regions includes generating, for each of the feature point sets, the virtual regions based on, among the plurality of feature points included in each feature point set, the feature points for which the distance acquired based on the provisional fundamental matrixes in the acquiring of the distances is within a threshold value.

9. The non-transitory computer-readable recording medium according to claim 7, wherein when generating, for each of the plurality of feature point sets, the virtual regions based on the plurality of feature points included in each feature point set, the generating of the virtual regions include generating the virtual regions having the same area.

* * * * *